US012134208B2

(12) United States Patent
Stichel

(10) Patent No.: US 12,134,208 B2
(45) Date of Patent: Nov. 5, 2024

(54) DEVICE FOR PRODUCING CONCRETE SLABS

(71) Applicant: KOBRA FORMEN GMBH, Lengenfeld (DE)

(72) Inventor: Holger Stichel, Lengenfeld-OT Pechtelsgruen (DE)

(73) Assignee: KOBRA FORMEN GMBH, Lengenfeld (DE)

( * ) Notice: Subject to any disclaimer, the term of this patent is extended or adjusted under 35 U.S.C. 154(b) by 200 days.

(21) Appl. No.: 17/786,653

(22) PCT Filed: Dec. 15, 2020

(86) PCT No.: PCT/EP2020/086138
§ 371 (c)(1),
(2) Date: Jun. 17, 2022

(87) PCT Pub. No.: WO2021/122541
PCT Pub. Date: Jun. 24, 2021

(65) Prior Publication Data

US 2023/0019683 A1 Jan. 19, 2023

(30) Foreign Application Priority Data

Dec. 20, 2019 (DE) ..................... 10 2019 135 427.7

(51) Int. Cl.
*B28B 3/02* (2006.01)
*B28B 3/08* (2006.01)
(Continued)

(52) U.S. Cl.
CPC .............. *B28B 3/028* (2013.01); *B28B 3/022* (2013.01); *B28B 3/083* (2013.01); *B30B 11/022* (2013.01); *B30B 11/04* (2013.01); *B30B 15/041* (2013.01)

(58) Field of Classification Search
CPC ....... B28B 7/0014; B28B 3/083; B28B 3/028; B30B 15/041
See application file for complete search history.

(56) References Cited

U.S. PATENT DOCUMENTS 9,610,708 B2 4/2017 Stichel et al.
2006/0197259 A1* 9/2006 Ishler ........................ B28B 3/06 264/319

FOREIGN PATENT DOCUMENTS

DE 36 38 207 A1 5/1988
DE 199 24 926 C1 4/2000
(Continued)

OTHER PUBLICATIONS

International Search Report of PCT/EP2020/086138, mailed Apr. 14, 2021.

*Primary Examiner* — Jerzi H Moreno Hernandez
(74) *Attorney, Agent, or Firm* — Collard & Roe, P.C.

(57) ABSTRACT

In a device for producing concrete slabs, a mold lower part is inserted into a frame secured via retaining braces to receiving areas of guiding columns oriented along an insertion direction and having, above the mold lower part, a structural loading device movable along the guiding columns and having, on the side facing the mold lower part, a mold upper part with one or more pressure plates inserted or insertable into one or more recesses of the mold lower part, the structural loading device being connected to the pressure plates via pressure rams. An upper guide element arranged between the structural loading device and the pressure rams interacts with a lower guide element arranged on the retaining brace such that, during the production of concrete slabs, the structural loading device is constantly guided relative to the mold lower part on a plane perpendicular to the insertion direction.

10 Claims, 8 Drawing Sheets

Figure 1:
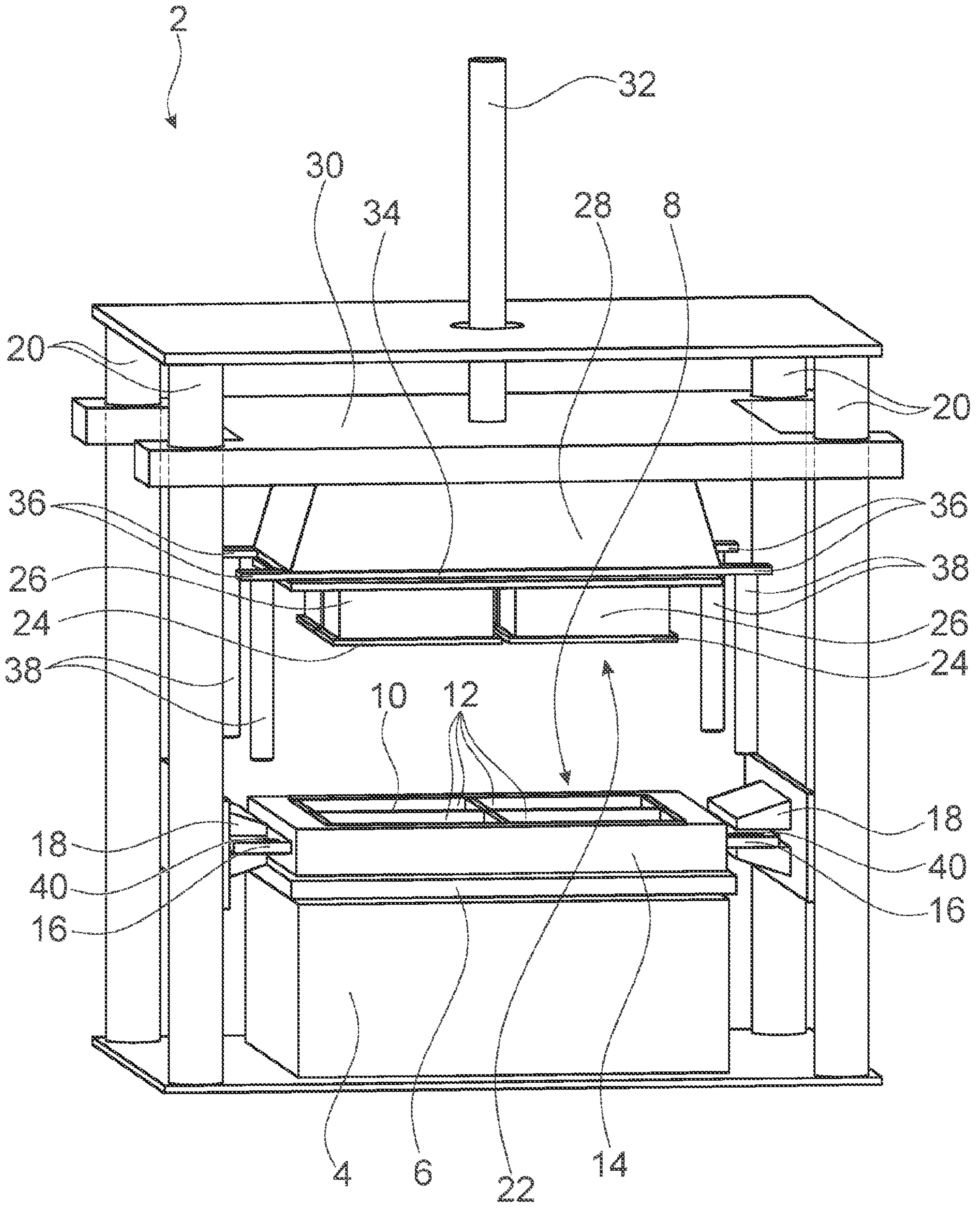

(51) Int. Cl.

| | |
|---|---|
| ***B30B 11/02*** | (2006.01) |
| ***B30B 11/04*** | (2006.01) |
| ***B30B 15/04*** | (2006.01) |

(56) References Cited

FOREIGN PATENT DOCUMENTS

| | | | | |
|---|---|---|---|---|
| DE | 10 2004 004 188 A1 | | 10/2005 | |
| DE | 10 2005 048 930 A1 | | 5/2006 | |
| DE | 10 2008 017 964 A1 | | 10/2009 | |
| DE | 10 2015 103 829 A1 | | 9/2016 | |
| WO | WO-2006111254 A1 | * | 10/2006 | ........... B30B 15/022 |

* cited by examiner

DEVICE FOR PRODUCING CONCRETE SLABS

CROSS REFERENCE TO RELATED APPLICATIONS

This application is the National Stage of PCT/EP2020/086138 filed on Dec. 15, 2020, which claims priority under 35 U.S.C. § 119 of German Application No. 10 2019 135 427.7 filed on Dec. 20, 2019, the disclosure of which is incorporated by reference. The international application under PCT article 21(2) was not published in English.

The invention relates to an apparatus for the production of concrete blocks.

From the general state of the art, it is known to use apparatuses for the production of concrete blocks, in which a concrete mixture is accordingly compacted by means of what is called a block-making machine, within a block mold, so as to create a concrete block. Typically such apparatuses contain a ramming unit having pressure plates that can engage into one or more mold cavities of a lower mold part. The lower mold part is open toward the top and the bottom, wherein the underside is closed off by means of a horizontal support. Concrete mixture poured through the top openings of the mold cavities, by means of a filling cart, which mixture is subsequently pressed by way of the pressure plates, in that these are lowered into the mold cavities through the upper openings, by means of a load application unit. Subsequently solidification of the concrete mixture to produce molded concrete parts that are stable in shape takes place by means of shaking the support. In a final step, the molded concrete parts are unmolded through the lower openings of the mold cavities.

The ramming unit is typically activated hydraulically and can be moved vertically within the molding machine by means of the load application unit. In this regard, the load application unit usually forms an upper mold part together with the ramming unit, as an integrated module that is arranged above the lower mold part and can be connected with a hydraulic press from the opposite side. A uniform block height can be achieved even in the case of different compaction of the concrete mixture, wherein stops are typically provided on the ramming unit.

In the case of known apparatuses for the production of concrete blocks, the connection between the upper mold part and the lower mold part has particular significance.

Thus, for example, it is known from DE 36 38 207 A1 that in the case of such molds, there is the risk of a collision of the pressure ram with a top side of the lower mold part in the case of insufficient alignment of the upper mold part relative to the lower mold part. This particularly occurs if the upper mold part is guided into the molding machine into the lower mold part, so as to shape and compact the molded concrete part that is to be produced. According to solutions known from the state of the art, attempts were made to circumvent this in that the upper mold part is precisely aligned with the lower mold part, and corresponding introduction slants are provided on the mold cavities, thereby facilitating the introduction of the pressure plates.

However, the connection between upper mold part and lower mold part was also already examined in greater detail in the state of the art, in a different context. Thus, a block molding machine is known from DE 199 24 926 A1, on the guidance columns of which a block mold is arranged. The block mold consists of a lower mold part and an upper mold part, which are arranged so that they can be either firmly connected with one another or displaceable relative to one another, depending on the work cycle. This allows easy continued processing, in particular by means of a pull-off mechanism that separates the lower mold part and the upper mold part from one another.

From DE 10 2005 048 930 A1, a block mold for the production of concrete blocks is known, which comprises an upper mold part having at least one ram having a pressure piece, and a lower mold part having at least one mold cavity, for use in a block molding machine, wherein the lower mold part can be moved up and down in a block molding machine. The lower mold part can be laid down onto a mold support of the block molding machine, and the upper mold part can be coupled with a machine holder of the block molding machine that can be moved up and down. A filling box of the block molding machine can be moved over the lower mold part, and the upper mold part and/or the lower mold part has/have play relative to a machine frame of the block molding machine. In this regard, a centering unit is provided in an xy plane for aligning the lower mold part and the upper mold part. In this regard, precise centering of the two mold parts relative to one another is brought about, wherein a conical section on the centering unit slowly releases the centering of the mold parts again after the pressure piece has moved into place.

In DE 10 2015 103 829 A1, an apparatus for the production of molded concrete parts in a molding machine is described, which comprises an upper mold part having at least one pressure ram for transferring a force to at least one pressure plate, wherein the pressure plate can be introduced into an opening of a mold cavity/cavities in a lower mold part in the vertical direction, wherein the lower mold part is surrounded by a frame that has a guidance means connected with the upper mold part, which means is configured in such a manner that the lower mold part can be tilted relative to the upper mold part, out of the vertical direction, during engagement of the pressure plates into the openings of the mold cavity/cavities.

It is the task of the invention to create an apparatus for the production of molded concrete parts, in which the centering between upper mold part and lower mold part is further improved, wherein in particular, all the phases of the production sequence are supposed to be taken into consideration.

This task is accomplished by means of the characteristics of claim 1. Further advantageous embodiments of the invention are the object of the dependent claims, in each instance. These can be combined with one another in a technologically practical manner. The description, in particular in connection with the drawing, additionally characterizes and specifies the invention.

According to the invention, an apparatus for the production of concrete blocks is created, in which a lower mold part is inserted into a frame that is attached, by way of retaining braces, to holders of multiple guidance columns, which are oriented along an insertion direction and have a load application device that can be moved along the guidance columns, above the lower mold part, which device has an upper mold part on its side that faces the lower mold part, on which one or more pressure plates can be introduced or are introduced into one or more recesses of the lower mold part, wherein the load application device is connected with the pressure plates by way of pressure rams, wherein an upper guidance element is arranged between the load application device and the pressure rams, which element interacts with a lower guidance element arranged on the retaining brace, in such a manner that during the production of the concrete blocks the load application device is constantly guided, relative to the lower mold part, in a plane perpendicular to the insertion direction.

Accordingly, in the case of the apparatus according to the invention, an upper guidance element is arranged on the load application device, and a lower guidance element is arranged on the holder, which parts take on the guidance of the upper mold part with the pressure rams and the lower mold part with the recesses, and which guarantee constant guidance of the pressure rams relative to the lower mold part on the guidance columns, in addition to the guidance that is already present. In this regard, guidance of the load application device relative to the lower mold part constantly takes place in a plane perpendicular to the insertion direction, during the production of concrete blocks. It is true that the upper and the lower guidance element can be pushed apart, relative to one another, so far in the axial direction that they are no longer in engagement, so that guidance relative to one another no longer takes place during refitting or maintenance, for example, but during the production of concrete blocks, in other words also during filling using a filling cart, compression or unmolding, guidance takes place between the load application device relative to the lower mold part, in the plane perpendicular to the insertion direction. It has been observed that guidance by way of the guidance columns is often insufficient, so that the pressure plates occasionally impact laterally in the recesses or are set onto them, and this results in increased wear. The solution according to the invention now creates a type of self-guided apparatus in a block production machine, in the case of which guidance by way of the upper guidance element and the lower guidance element, in particular, for example during filling using a filling cart, can be guaranteed. The pressure plates and the recesses in the lower mold part now merely have a shaping property for the desired block product, so that they no longer have to be provided with any kind of additional guidance function.

According to an embodiment of the invention, the load application device is connected with the guidance columns by way of a bear plate, wherein the pressure rams are connected by way of a ram plate that is connected with the load application device by way of an intermediate plate, wherein the intermediate plate has sections that project outward laterally, on which sections the upper guidance device is arranged.

In addition to the weight of the load application device, the latter is connected by way of a bear plate, for example with a hydraulic press, wherein the combination of load application device and bear plate is connected with the guidance columns in a technically usual manner. The pressure rams are not connected directly with the load application device on their side that faces away from the recesses, but rather are typically screwed onto an intermediate plate that has sections that project laterally outward, so that a connection possibility for the upper guidance device is created outside of the block field. Accordingly, a compact construction is obtained, in which guidance is achieved by way of the upper guidance device on the load application device, without allowing the design of an apparatus according to the invention to become complicated. In particular, the apparatus according to the invention makes it possible to replace wear parts such as the pressure plates or also the upper guidance device in a simple manner in the event of wear, while the pressure rams or the basic top load can continue to be used even in the case of replacement or wear, as reusable parts in the region of the upper mold part.

According to a further embodiment of the invention, the upper and the lower guidance device have multiple guidance positions in the region of the frame and to the side of the load application device.

Accordingly, guidance between lower mold part and upper mold part is achieved at multiple guidance positions, so that more precise guidance or centering of the two components relative to one another can be guaranteed. In this regard, it is particularly provided to provide two opposite sides of the lower mold part or the load application device with corresponding guidance positions, which are advantageously arranged diagonally opposite one another, so as to further improve the guidance between upper mold part and lower mold part. Alternatively or in addition, four guidance positions can also be provided, which are advantageously arranged in the region of the corners of the frame or of the load application device. A double or quadruple embodiment of the guidance positions allows a precise guidance function by means of the upper and the lower guidance element.

According to a further embodiment of the invention, the upper guidance element and the lower guidance element have multiple centering bolts that engage into centering bushings.

Accordingly, the guidance between upper mold part and lower mold part is achieved by means of centering bolts and centering bushings, which can be selected with a round cross-section, for example, so as to create constant concentric guidance of the upper mold part relative to the lower mold part. In other embodiments, however, it is also conceivable to use different cross-sections or to work with different diameters along the guidance bolt.

In this regard, it is particularly provided that the guidance bushings and/or the guidance bolts are replaceable, since these, as movable parts, are subject to wear and might have to be replaced one or more times, as long as the apparatus according to the invention is in use.

According to a further embodiment of the invention, the lower mold part is arranged on a vibrating table by way of a production board, wherein the frame of the lower mold parts predetermines the mold height. In this regard, the lower mold part can have a replaceable insert, which can also be replaced during operation of the apparatus according to the invention, as a wear part, or alternatively is adapted to a different block shape, if the apparatus is supposed to be refitted for a different block shape. Just like the pressure plates and the centering bolts or centering bushings, use of the lower mold part in the form of a wear part is provided for, while the frame of the lower mold part is a reusable component of the apparatus. In the case of a different block position but the same mold height, the frame can therefore be reused.

In this regard, the apparatus is structured in such a manner that its components are so replaceable that in the event of wear or a change in the block mold, easy adaptation is possible.

Figure 2:
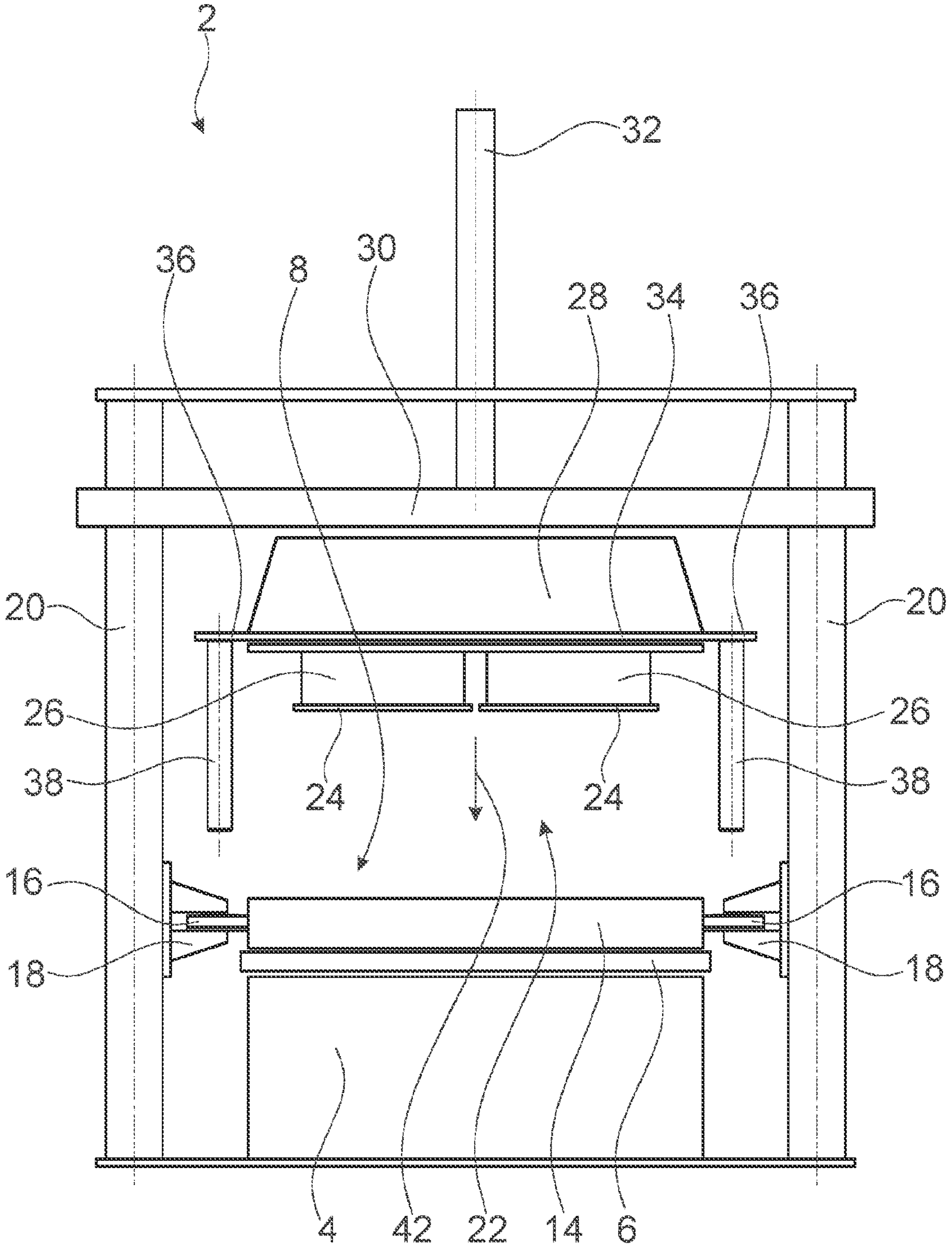
Figure 3:
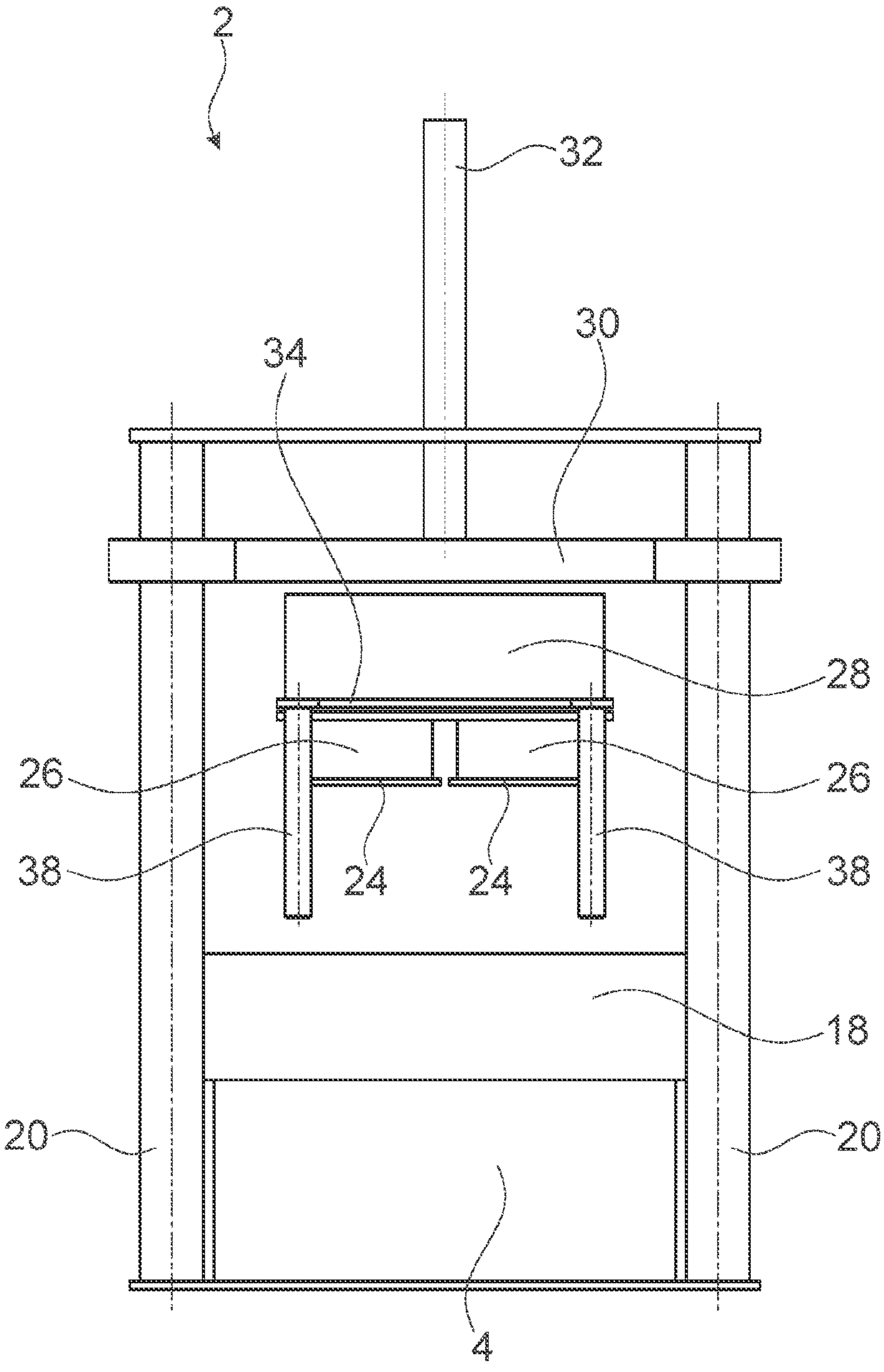
Figure 4:
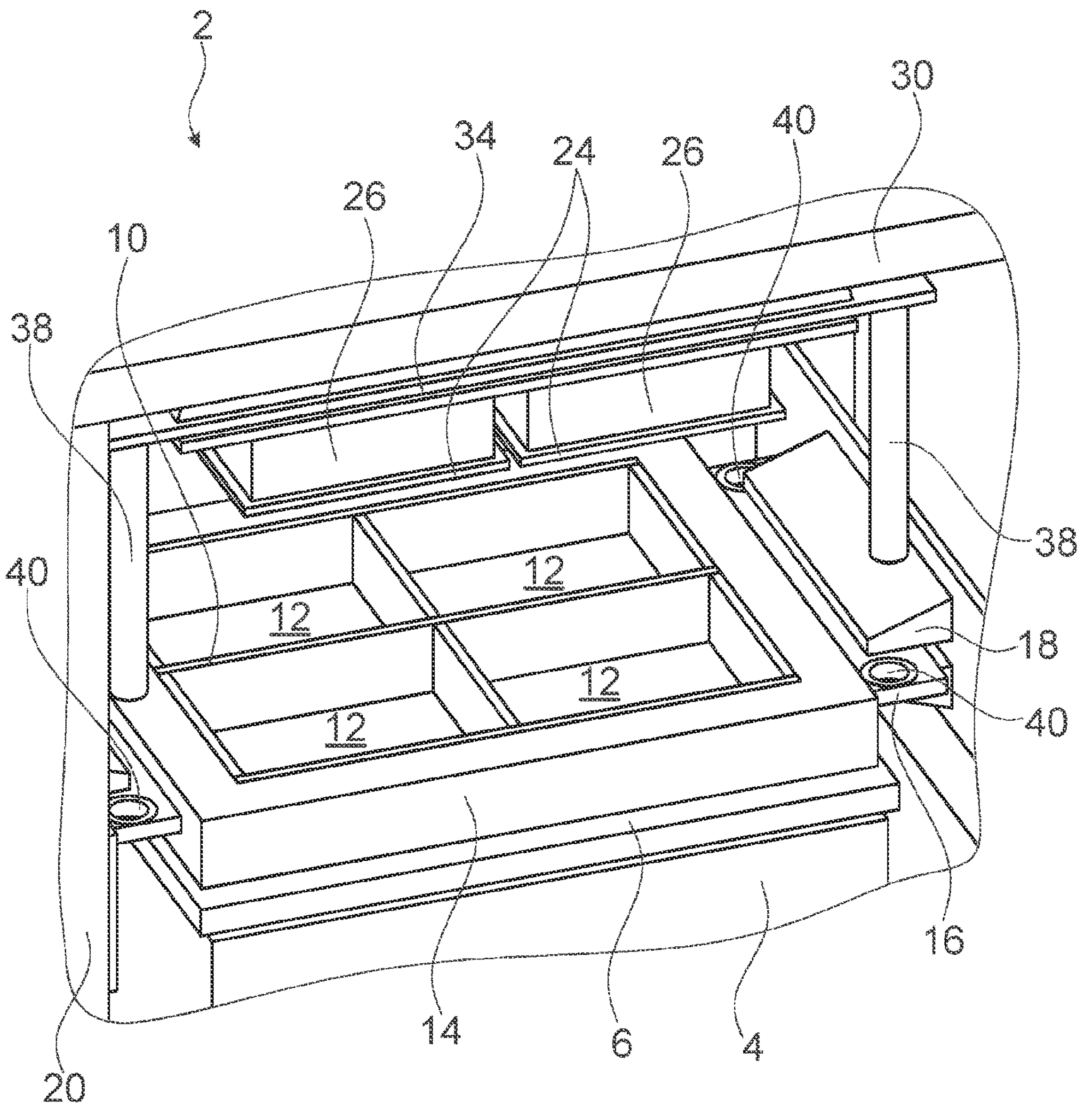
Figure 5A:
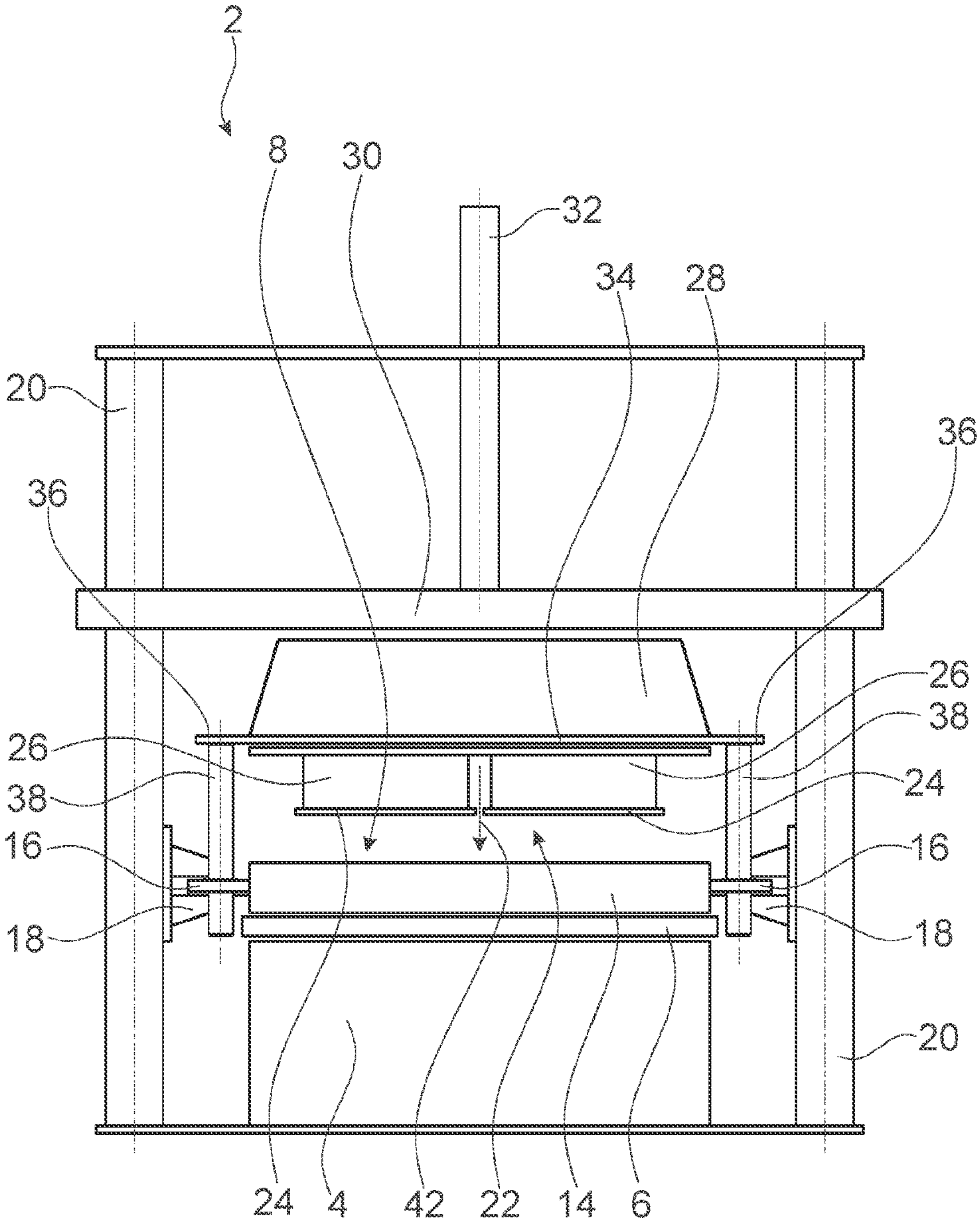
Figure 5B:
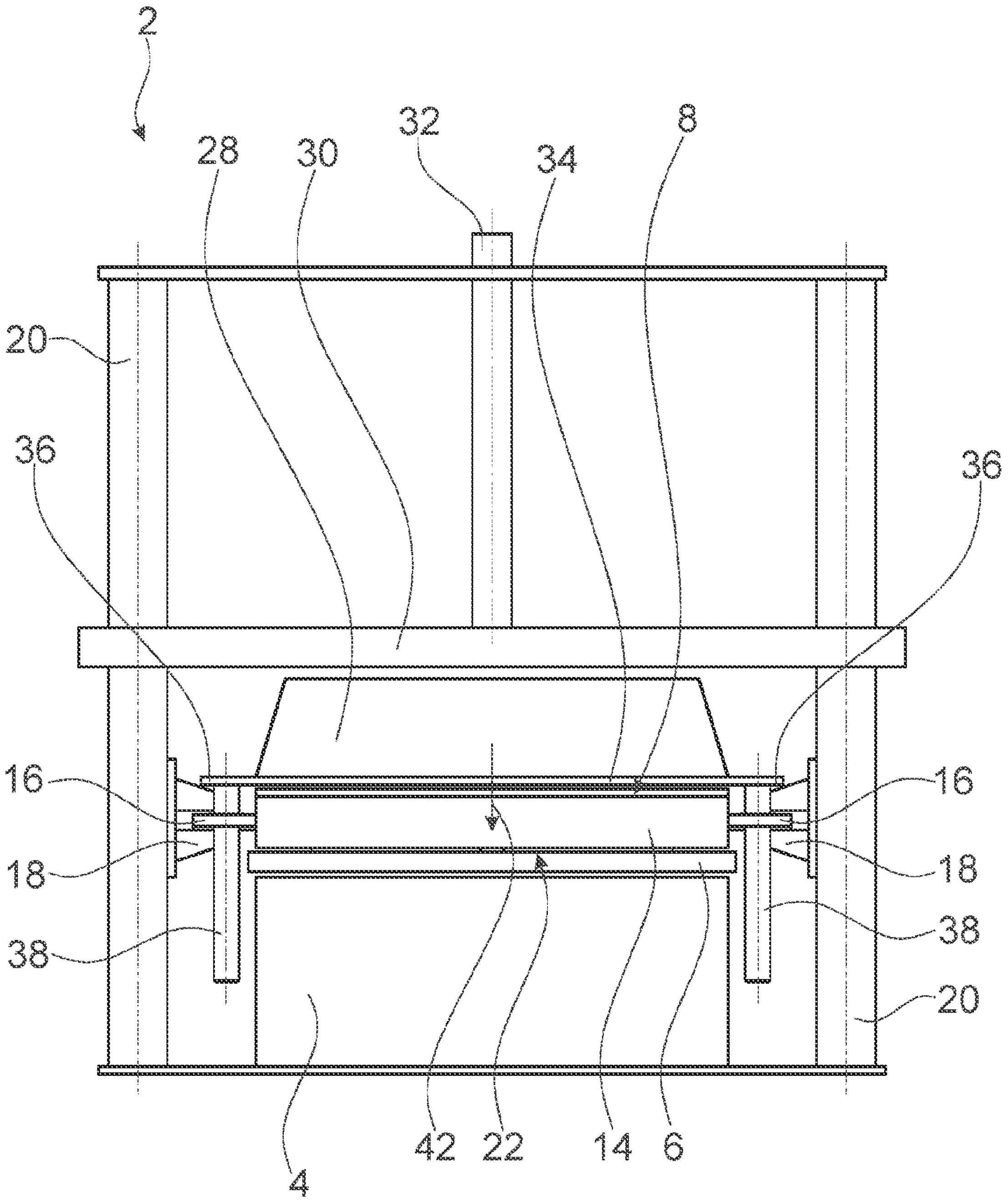
Figure 6A:
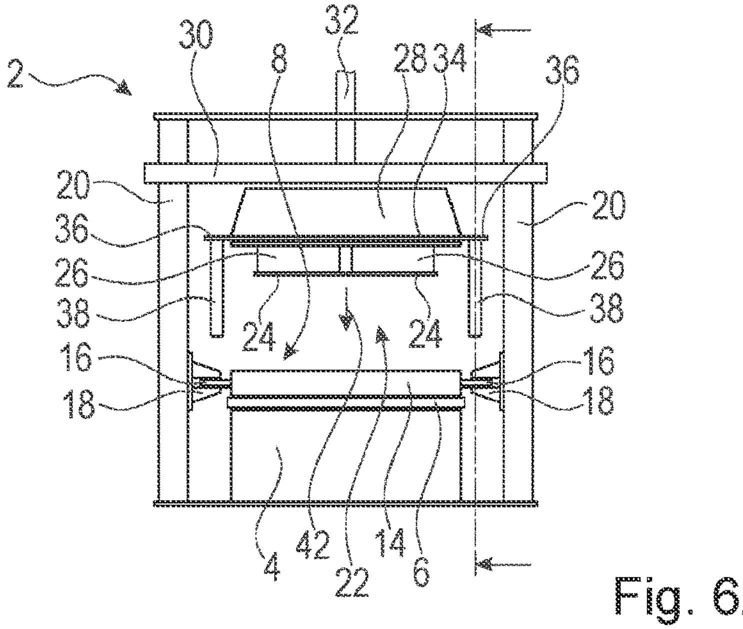
Figure 6B:
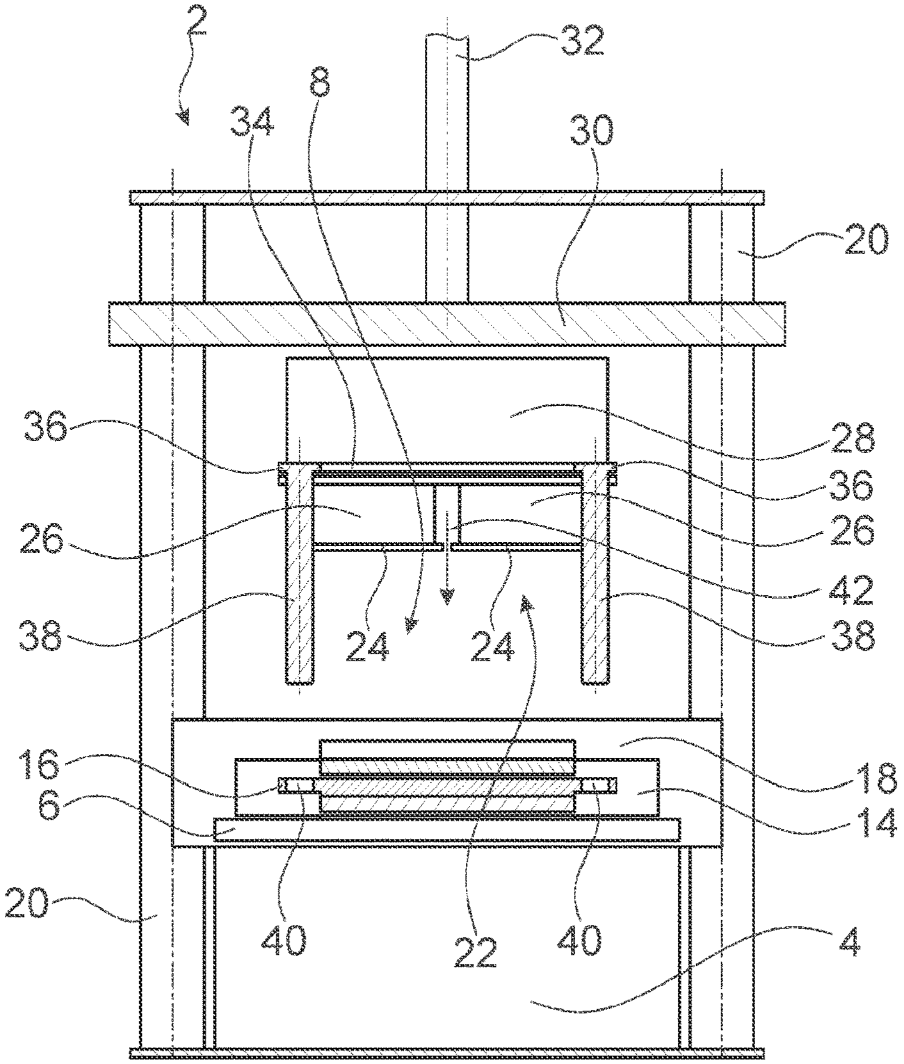
Figure 7:
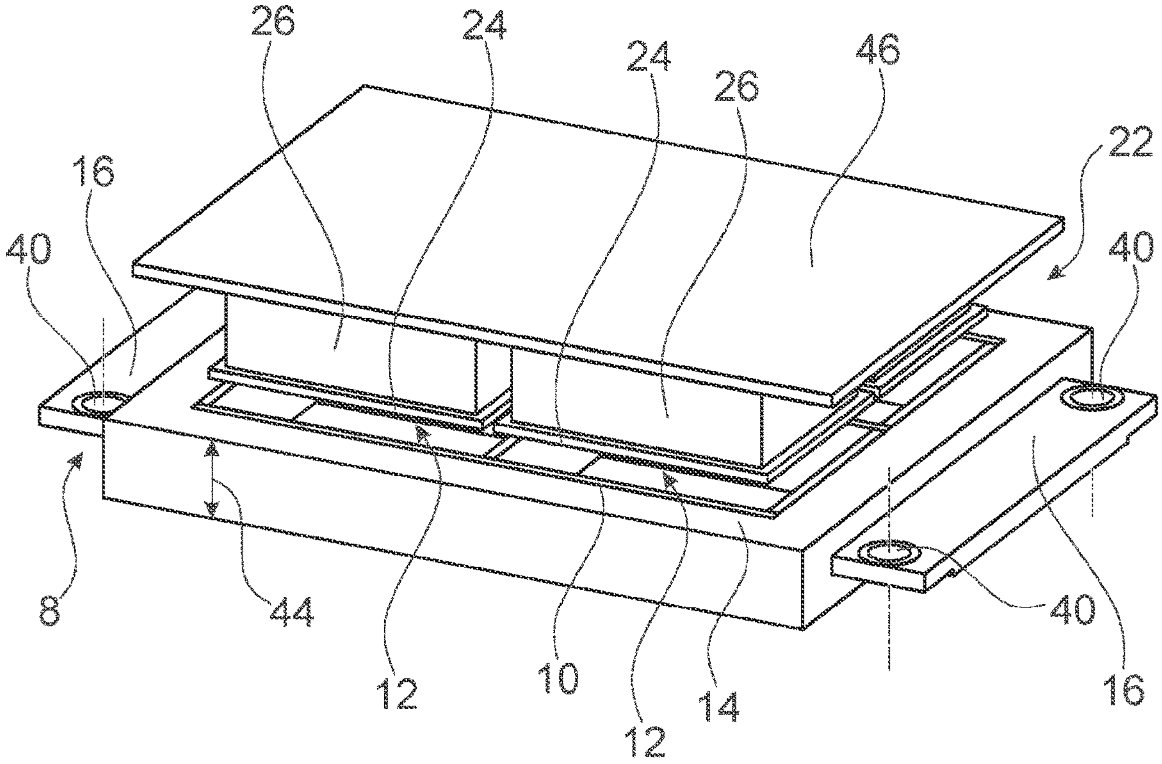

In the following, some exemplary embodiments will be explained in greater detail, using the drawing. The figures show:

FIG. 1 an apparatus according to the invention in a perspective side view,

FIG. 2 the apparatus from FIG. 1 in a first side view,

FIG. 3 the apparatus from FIG. 1 in a second side view,

FIG. 4 a detail of the apparatus from FIG. 1 in a perspective side view, FIG. 5A a further side view of the apparatus according to the invention during operation, FIG. 5B a further side view of the apparatus according to the invention during operation, FIG. 6A a further side view of the apparatus according to the invention, FIG. 6B a sectional view of the apparatus according to the invention in a side view, and FIG. 7 a detail of the apparatus according to the invention in a perspective side view.

In the figures, components that are the same or have the same functional effect are provided with the same reference symbols.

Making reference to FIG. 1, a first exemplary embodiment of an apparatus 2 according to the invention will be explained in detail in the following. In this regard, the apparatus 2 is shown in a perspective side view and has a vibrating table 4, in a technically usual manner, on the top of which table a production board 6 is situated. A lower mold part 8 is arranged on the production board 6, which part has a replaceable insert 10 having recesses 12, which are surrounded by a frame 14, wherein the insert 10 is interchangeable in the frame 14. On two opposite sides, the frame 14 has retaining braces 16, which create a connection between the frame 14 and a holder 18, in each instance. The retaining braces 16 can also be part of the holder 18. The two holders 18 are arranged on four guidance columns 20, which are arranged in the region of the corners of the lower mold part 8, in a technically usual manner, and surround the region outside of the vibrating table 4. The upper mold part 22 is arranged to lie opposite the recesses 12; it has multiple pressure plates 24 that approximately correspond to the recesses 12 in terms of their dimensions. The pressure plates 24 are connected with a load application device 28 by way of pressure rams 26, which device in turn stands in connection with a bear plate 30 on the side facing away from the upper mold part, which plate is guided on the guidance columns 20 and can be activated by way of a ram 32, using a hydraulic press.

A holding plate 34 is affixed between the pressure rams 26 and the load application device 28, which plate has sections 36 that project beyond the load application device 28, which sections each have a guidance bolt 38 facing the lower mold part 8 on their underside, which bolt can engage into a corresponding guidance bushing 40 on the retaining braces 16, wherein the apparatus 2 according to FIG. 1 has corresponding guidance bolts 38 on each corner of the upper mold part 22 as well as corresponding guidance bushings 40 on each corner of the lower mold part 8, so that the upper mold part 22 is guided with reference to the lower mold part 8, by way of the combination of guidance bolt 38 and guidance bushing 40.

The apparatus 2 according to the invention thereby creates a combination of upper mold part 22 and lower mold part 8, in which guidance takes place not only by way of the guidance columns 20 but also by way of guidance devices formed by the guidance bolts 38 and guidance bushings 40. Therefore the pressure plates 24, together with the insert 10, no longer take on any kind of guidance function, since these are required solely for compression of the concrete mixture situated in the recesses 12, and no contact can take place any longer between the two movable parts during a movement of the upper mold part 22 in the direction of the lower mold part 8.

Making reference to FIG. 2, the apparatus 2 from FIG. 1 is shown once again in a first side view. One can see that the guidance bolts 38 that form the upper guidance device are arranged outside of the region of the block field, on the sections 36 that project laterally, so that these can engage into the corresponding bushing on the retaining brace 16, past the production board 6 and the vibrating table 4, without thereby restricting the movement of the upper mold part 22 relative to the lower mold part 8, except for the guidance in a plane perpendicular to the insertion direction 42.

In FIG. 3, the apparatus from FIG. 1 is shown once again in a second side view from the narrower side of the upper mold part 22. It can be seen that the guidance bolts 38 are arranged in the region of the corners of the upper mold part 22, so that in total, four guidance bolts 38 can be used as a guidance aid. It is advantageous if these are arranged in the region of the corners of the upper mold part 22, wherein, however, an embodiment with only one guidance bolt 38 on a short side of the upper mold part 22, in each instance, would also be possible.

Making reference to FIG. 4, the position of the guidance bushings 40 in the retaining brace 16 is shown once again in greater detail. It can be seen that the guidance bushings 40 stand in a mechanically stable connection with the frame 14, by way of the retaining braces 16 and the holders 18, so that the guidance bolts 38 can be inserted accordingly. The holders 18 in turn are firmly connected with the guidance columns 20. The combination of guidance bolt 38 and guidance bushing 40 is drawn with round cross-sections in FIG. 4, which represent the preferred embodiments. In other embodiments, however, it can also be conceivable to use a different shape of the cross-sectional surface areas, so that elliptical, hexagonal or square bolts or bushings, for example, can also be used. In FIG. 4, the guidance bolt 38 is shown in the form of a cylinder. The latter can also have a slightly conical progression with reference to its outside surfaces.

In FIGS. 5A and 5B, the function of the guidance devices will be explained in greater detail below, by means of the guidance bolt 38 and the guidance bushing 40, during operation of the apparatus 2. It can be seen in FIG. 5A that when the lower mold part 8 is released, the guidance bolt 38 stands in engagement with the guidance bushing 40, so that filling of the lower mold part 8 with a concrete mixture, which is typically carried out by means of a filling cart, can be undertaken, wherein during filling, the upper mold part 22 is already guided with the lower mold part 8, by way of the guidance elements. During complete compression by means of the bear plate 30, as shown in FIG. 5B, the maximum engagement of the guidance elements is achieved, so that during operation of the apparatus 2, the upper mold part 22 remains constantly guided with reference to the lower mold part 8, so that the guidance by way of the guidance columns 20, which is usually not considered to be sufficient, can be eliminated.

In FIG. 6A, the view from FIG. 5A is shown once again, wherein here an auxiliary line is drawn in, which clarifies the section plane A-A' shown in FIG. 6B. It can be seen that the apparatus 2 has a modular construction, so that parts that wear rapidly, such as the guidance bolts 38, the guidance bushings 40, the pressure plates 24 or also the inserts 10, for example, can be rapidly replaced, so that a rapid exchange is possible both during adaptation of the apparatus 2 to changed block shapes and in the event of wear of individual components of the apparatus 2.

In FIG. 7, upper mold part 22 and lower mold part 8 are once again shown separately. It can be seen that the frame 14 of the lower mold part 8, which frame is provided with interchangeable inserts 10, has the lateral retaining brace 16 that is provided with the guidance bushings 40. In this regard, the height 44 of the frame 14 predetermines the height of the block formed in the recesses 12. Consequently the frame 14 can also be used for different block sizes, at the same block height, in that the insert 10 is replaced with a different insert, so that recesses 12 that are changed with regard to the dimensions would occur. Likewise, it can be seen that multiple pressure rams 26 and pressure plates 24 have been combined into a unit by means of a ram plate 46.

The characteristics indicated above and in the claims, as well as those that can be derived from the figures, can be advantageously implemented both individually and in various combinations. The invention is not restricted to the exemplary embodiments described, but rather can be modified in many different ways, within the scope of the ability of a person skilled in the art.

LIST OF REFERENCE SYMBOLS

2 apparatus
4 vibrating table
6 production board
8 lower mold part
10 insert
12 recesses
14 frame
16 retaining brace
18 holder
20 guidance columns
22 upper mold part
24 pressure plates
26 pressure ram
28 load application device
30 bear plate
32 ram
34 holding plate
36 sections
38 upper guidance element, guidance bolt
40 lower guidance element, guidance bushing
42 insertion direction
44 height
46 ram plate

The invention claimed is:

1. An apparatus for the production of concrete blocks, in which a lower mold part (8) is inserted into a frame (14) that is attached, by way of retaining braces (16), to holders (18) of multiple guidance columns (20), which are oriented along an insertion direction (42) and have a load application device (28) that can be moved along the guidance columns (20), above the lower mold part (8), wherein the load application device (28) has an upper mold part (22) on its side that faces the lower mold part (8), on which one or more pressure plates (24) can be introduced or are introduced into one or more recesses (12) of the lower mold part (8), wherein the load application device (28) is connected with the pressure plates (24) by way of pressure rams (26), wherein an upper guidance element (38) is arranged between the load application device (28) and the pressure rams (26), wherein the upper guidance element (38) interacts with a lower guidance element (40) arranged on at least one of the retaining braces (16), in such a manner that during the production of the concrete blocks comprising filling of the lower mold part (8), compression, and unmolding, the load application device (28) is constantly guided, relative to the lower mold part (8), in a plane perpendicular to the insertion direction (42), wherein the upper guidance element (38) and the lower guidance element (40) are in engagement throughout the production.

2. The apparatus according to claim 1, in which the load application device (28) is connected with the guidance columns (20) by way of a bear plate (30), wherein a holding plate (34) is arranged between the pressure rams (26) and the load application device (28), wherein the holding plate (34) has sections (36) that project laterally out of the holding plate (34), and the upper guidance element (38) is attached to one of the sections (36).

3. The apparatus according to claim 1, in which the upper guidance element (38) comprises a plurality of upper guidance elements (38) provided to the sides of the load application device (28), and the lower guidance element (40) comprises a plurality of lower guidance elements (40), the plurality of upper guidance elements (38) engageable with the plurality of lower guidance elements (40).

4. The apparatus according to claim 3, in which the upper guidance elements (38) are arranged on opposite sides of the load application device (28), and the lower guidance elements (40) are arranged on opposite sides of the frame.

5. The apparatus according to claim 4, in which the plurality of upper guidance elements (38) comprises four upper guidance elements (38), wherein the four upper guidance elements (38) are arranged in four corners of the load application device (28), and the plurality of lower guidance elements (4) comprises four lower guidance elements (40), wherein the four lower guidance elements (40) are arranged in four corners of the frame (14).

6. The apparatus according to claim 1, in which the upper guidance element (38) comprises a centering bolt, and the lower guidance element (40) comprises a centering bushing.

7. The apparatus according to claim 6, in which the lower guidance element (40) and/or the upper guidance element (38) is/are replaceable.

8. The apparatus according to claim 1, in which the lower mold part (8) is arranged on a vibrating table (4) by way of a production board (6), wherein the frame (14) of the lower mold part (8) predetermines a mold height of the lower mold part (8).

9. The apparatus according to claim 8, in which the lower mold part (8) has an interchangeable insert (10).

10. The apparatus according to claim 1, wherein at least one of the components of the apparatus can be changed in such a manner that in the event of wear, a replacement is possible.

* * * * *